F. A. KIRBY.
POWER TRANSMITTING MECHANISM FOR MOTOR VEHICLES.
APPLICATION FILED DEC. 13, 1910.

1,027,736.

Patented May 28, 1912.

2 SHEETS—SHEET 1.

Witnesses
Chas. W. Stauffiger
Otto F. Barthel

Inventor
Frank A. Kirby
By Lewis E. Flanders
Attorney

F. A. KIRBY.
POWER TRANSMITTING MECHANISM FOR MOTOR VEHICLES.
APPLICATION FILED DEC. 13, 1910.
1,027,736.
Patented May 28, 1912.
2 SHEETS—SHEET 2.
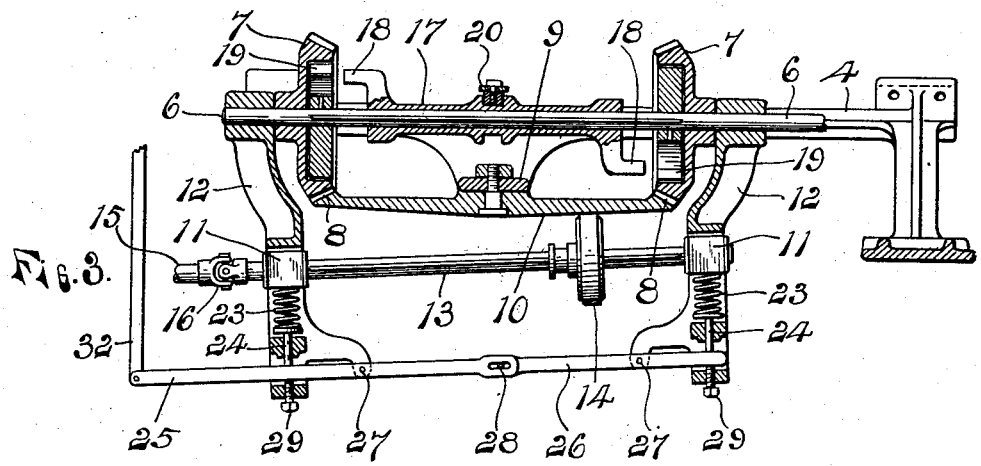
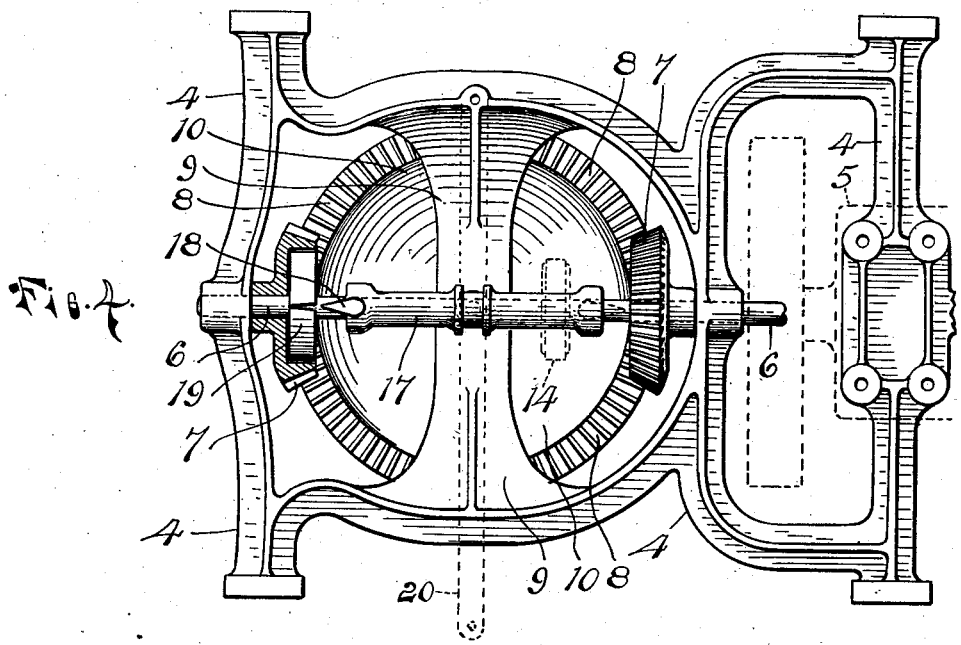

UNITED STATES PATENT OFFICE.

FRANK A. KIRBY, OF DETROIT, MICHIGAN, ASSIGNOR TO KIRBY MOTORCAR COMPANY, OF DETROIT, MICHIGAN, A CORPORATION OF MICHIGAN.

POWER-TRANSMITTING MECHANISM FOR MOTOR-VEHICLES.

1,027,736.  Specification of Letters Patent.  Patented May 28, 1912.

Application filed December 13, 1910. Serial No. 597,044.

*To all whom it may concern:*

Be it known that I, FRANK A. KIRBY, a citizen of the United States, residing at Detroit, in the county of Wayne and State of Michigan, have invented certain new and useful Improvements in Power-Transmitting Mechanism for Motor-Vehicles, of which the following is a specification.

Figure 1:
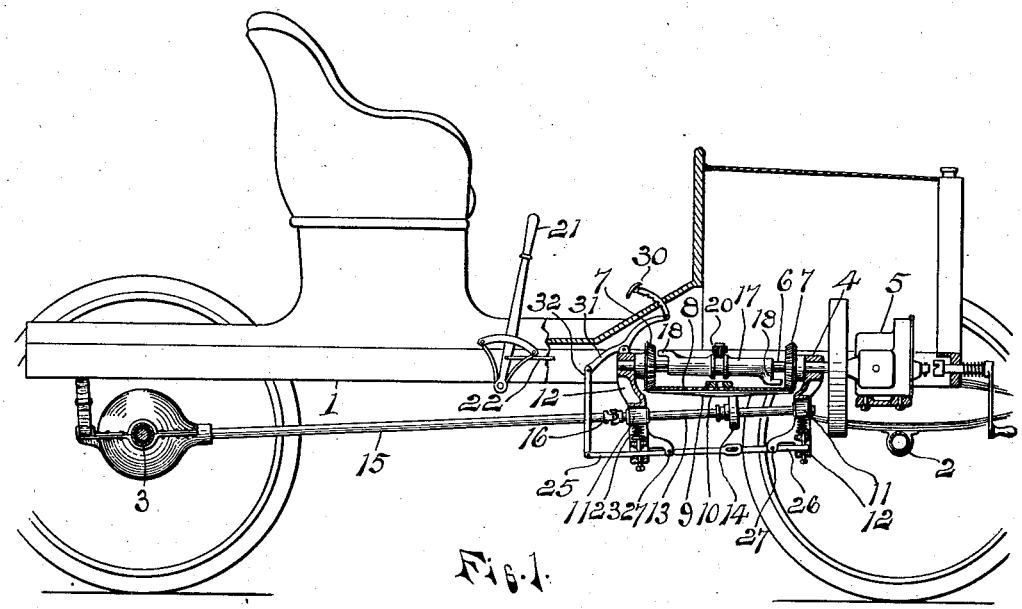
Figure 2:
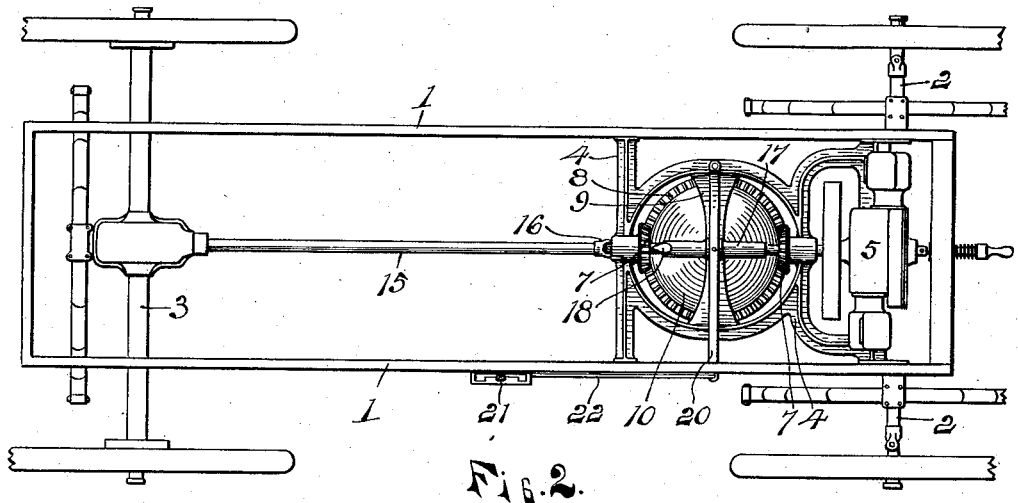

This invention relates to improvements in power transmission mechanisms and its object is to provide a transmission mechanism of the friction type in which the parts are so arranged as to particularly adapt the same for use in automobile construction and to insure the good contact of the friction members; and further, to provide certain other new and useful features in the construction and combination of parts, the invention consisting of the matters hereinafter set forth and more particularly pointed out in the claims, reference being had to the accompanying drawings in which, Figure 1 is a longitudinal vertical section through an automobile illustrating the application thereto of a power transmission mechanism embodying the invention; Fig. 2 is a plan view of the chassis of the same; Fig. 3 is an enlarged longitudinal section of the transmission mechanism detached; and Fig. 4 is a plan view of the same.

As shown in the drawings, 1 is the frame, 2 the front and 3 the rear axles of a motor vehicle. A supporting frame 4 for carrying the motor 5 and the transmission mechanism, is rigidly secured to the frame 1 near its forward end.

Mounted in suitable bearings on the supporting frame 4 and extending substantially in the longitudinal center of the vehicle frame 1, is a short shaft 6 forming a rearward continuation of the driving shaft of the motor. Loosely mounted upon this shaft 6 are two bevel gears 7 in engagement with a large gear 8 journaled in a horizontal position upon a cross member 9 of the supporting frame. This large gear is formed with or otherwise provided with a lower side formed slightly conical with a smooth lower surface and forming a driving friction disk 10.

Mounted in movable bearing blocks 11 carried by downwardly extending arms 12 on the frame 4, is a driven shaft 13 upon which is mounted a friction wheel 14 to engage the disk 10, said wheel being secured to the shaft to turn therewith by a spline on the shaft and free to move longitudinally thereof to change its point of contact with the disk. The shaft 13 is supported by its bearings parallel with the surface of the disk 10 at its forward side and the inclination of said surface is such that said driven shaft will extend substantially in direct alinement with the power transmitting shaft 15 which extends rearwardly from the rear end of the driven shaft to which it is attached by a universal joint 16, to the rear axle of the vehicle.

Slidable longitudinally upon the driving shaft 6 and operatively connected thereto by a spline to turn therewith, is a sleeve 17 formed at each end with a longitudinally extending wedge arm 18 to engage and operate a clutch 19 located within a recess in each gear 7, said clutch member being keyed or otherwise secured to the shaft and adapted to be expanded by the wedge arm into contact with the walls of the recess in the gear to connect said gear to the shaft to turn therewith. The operation of the clutch of one gear will cause that gear to transmit motion from the driving shaft to the disk in one direction and drive the vehicle ahead, and when the other clutch is operated, motion will be imparted to the disk to turn the same in an opposite direction and drive the vehicle backward. The sleeve 17 is shifted by means of a lever 20 pivoted at one end on the frame 4 and extended across the frame over the sleeve, said lever being provided with a projection engaging the groove. The said lever is actuated to shift the sleeve, in any suitable manner as by a hand lever 21 connected to the free end of the lever by a rod 22.

The driven shaft 13 is moved laterally toward the disk to hold its friction wheel in contact with said disk, by springs 23 in the guide slots of the arms 12 in which the shaft bearings 11 are movable. At their upper ends these coiled springs 23 bear against the under side of the bearings 11 and they are seated at their lower ends upon headed pins 24 mounted in bearings in the arms with their heads in the lower ends of the slots and their lower ends projecting into guide openings in the lower ends of the bearing arms. Bars 25 and 26 pivoted intermediate their ends at 27 upon brackets extending laterally from said arms, pass through said guide openings in engagement with the lower ends of said pins 24 and these bars are connected at their adjacent ends by a pin 28 on one bar engaging a longitudinal slot in the other bar.

Engaging a screwthreaded opening in the lower end of each bracket arm 12 is a set screw 29 which projects therethrough into engagement with the lower side of one of the bars 25 or 26 opposite the pin 24 to force the bar upward against the end of said pin and increase the force with which the spring 23 will hold the friction wheel 14 in contact with the disk 10. This pressure may be increased at will by the operator, by turning the bars on their pivots by means of a foot pedal 30 attached to one end of a rocker bar 31 pivotally supported intermediate its ends on the frame 4 and connected at its opposite end by a link 32 with the rear end of the bar 25. The springs 23 are set up by the set screws 29 sufficiently to normally hold the friction members in contact with sufficient force to prevent slippage under ordinary load, but when by reason of bad roads or other unusual conditions an extra pressure is required to prevent slippage, such pressure may be readily applied by means of the foot pedal.

By arranging the friction disk in an inverted position and driving the same by means of bevel gears on the engine shaft extending over the disk, a clutch may be readily employed to stop, start and reverse, and the friction disk and wheel are protected by their position from grease and dirt which would cause wear and slippage. The positioning of the driven shaft below the driving disk, brings the same down nearly to the horizontal plane of the rear axle and at the same time positions the motor far enough above the front axle so that it will not come in contact therewith upon flexure of the springs. By forming the friction driving disk with a conical contact surface, the driven shaft is set at an inclination to correspond therewith so that it will extend substantially in alinement with the shaft extending to the rear axle without the necessity for setting the engine at an inclination, the disk is made stronger without added weight, and the wheel may be moved out of contact with the disk by moving said wheel rearwardly past the center of the disk. The driving gears engaging the disk at its periphery, also serve to support the disk against the thrust of the wheel.

What I claim is:

1. In a motor vehicle, the combination with an axle and a driving shaft for transmitting motion to the axle, of a horizontally disposed disk mounted to turn upon a vertical axis, a power shaft extending diametrically across the disk above the same, a driven shaft extending diametrically across said disk below the same and connected at one end to the driving shaft, members on the power shaft engaging the disk near its edge at diametrically opposite points to transmit motion thereto, and means on the driven shaft to frictionally engage the other side of the disk and transmit motion from said disk to said shaft.

2. In a motor vehicle the combination with an axle and a driving shaft for transmitting motion to the axle, of a horizontally disposed disk having a plain side, gear teeth on the opposite side of the disk, a power shaft extending diametrically across the disk, gears on the power shaft engaging the teeth on the disk, clutches for securing the gears to the power shaft, a driven shaft extending adjacent to the plain side of the disk and connected at one end to the driving shaft, and a friction wheel on the driven shaft in engagement with the disk.

3. In a motor vehicle, the combination with an axle and a driving shaft for transmitting motion to the axle, of a horizontally disposed disk having a conical friction surface at its lower side, gear teeth on its upper side, a power shaft extending diametrically across the upper side of the disk, gears loosely mounted upon the power shaft in engagement with the teeth on the disk, clutch members for connecting the gears to the power shaft, means for operating the clutch members, a driven shaft extending diametrically across the lower side of the disk parallel with said conical surface at one side of the axis of the disk and connected at one end to the driving shaft, a friction wheel on the driven shaft in engagement with the conical surface of the disk, and means for moving the driven shaft laterally to bring the friction wheel into frictional contact with the disk.

4. In a motor vehicle, the combination with an axle and a driving shaft for transmitting motion to the axle, of a supporting frame, a disk mounted to turn upon said frame, a power shaft, means for transmitting motion from the power shaft to turn the disk, movable bearings on the frame at one side of the disk, a driven shaft mounted in said bearings, a friction wheel on the driven shaft to engage the disk, springs engaging the bearings to move the same and hold the friction wheel in contact with the disk, set screws for regulating the tension of the springs and manually operated lever mechanism for increasing the tension of the springs to increase the frictional contact of the wheel with the disk.

5. In a motor vehicle the combination with an axle and a driving shaft for transmitting motion to the axle, of a supporting frame, a friction disk mounted on said frame, means for transmitting motion to turn the disk, slotted brackets on the frame, bearings movable in the slots of the brackets, a driven shaft mounted in said bearings, a friction wheel on the driven shaft to engage the disk, springs in the slots of the brackets engaging the bearings, headed pins on the brackets engaging one end of the springs, pivoted levers engaging the pins to force the same inward against the action of the springs and move the bearings to increase the frictional contact of the friction wheel with the disk, and manually operated means for moving the levers.

6. In a motor vehicle, the combination with an axle and a driving shaft for transmitting motion to the axle, of a horizontally disposed friction disk, gear teeth on one side of the disk at its periphery, a power shaft extending diametrically across the disk, gears loosely mounted upon the power shaft in engagement with the teeth on the disk, a clutch for connecting each gear with the power shaft, a sleeve slidable longitudinally upon the power shaft between the gears for actuating the clutches, a driven shaft at the opposite side of the disk connected at one end to the driving shaft, a friction wheel operatively connected to the driven shaft to turn therewith and slide longitudinally thereon in contact with the disk, and means for moving the driven shaft toward the disk to hold the wheel in contact with the disk.

7. In a motor vehicle, the combination with an axle and a driving shaft for transmitting motion to the axle, of a supporting frame, a disk mounted on the frame in a horizontal position and provided with a conical contact surface at its lower side, gear teeth upon the upper side of the disk, a power shaft mounted in bearings on the frame and extending diametrically across the disk, gears on the power shaft engaging the teeth on the disk, clutches on the power shaft for connecting the gears to the shaft, a sleeve on the power shaft movable longitudinally thereof and operatively connected thereto to turn therewith, means on the ends of the sleeve for engaging and operating the clutches, means for shifting the sleeves, a driven shaft connected at one end to the driving shaft and extending diametrically across the disk in alinement with said shaft parallel with the conical surface of the disk at one side of the axis of said disk, a friction wheel on the driven shaft movable longitudinally thereon and operatively connected thereto to turn therewith, movable bearings for the driven shaft and manually operated lever mechanism for moving said bearings to move the friction wheel toward the disk and increase its frictional contact therewith.

In testimony whereof I have affixed my signature in presence of two witnesses.

FRANK A. KIRBY.

Witnesses:
LEWIS E. FLANDERS,
ANNA M. SHANNON.

---

Copies of this patent may be obtained for five cents each, by addressing the "Commissioner of Patents, Washington, D. C."